July 21, 1953  P. MARTIN  2,645,911
FROZEN MIX MAKING DEVICE
Filed April 29, 1950  2 Sheets-Sheet 1

PHILIP MARTIN
INVENTOR.

BY *Lyon T Lyon*

ATTORNEYS

July 21, 1953
P. MARTIN
2,645,911
FROZEN MIX MAKING DEVICE
Filed April 29, 1950
2 Sheets-Sheet 2
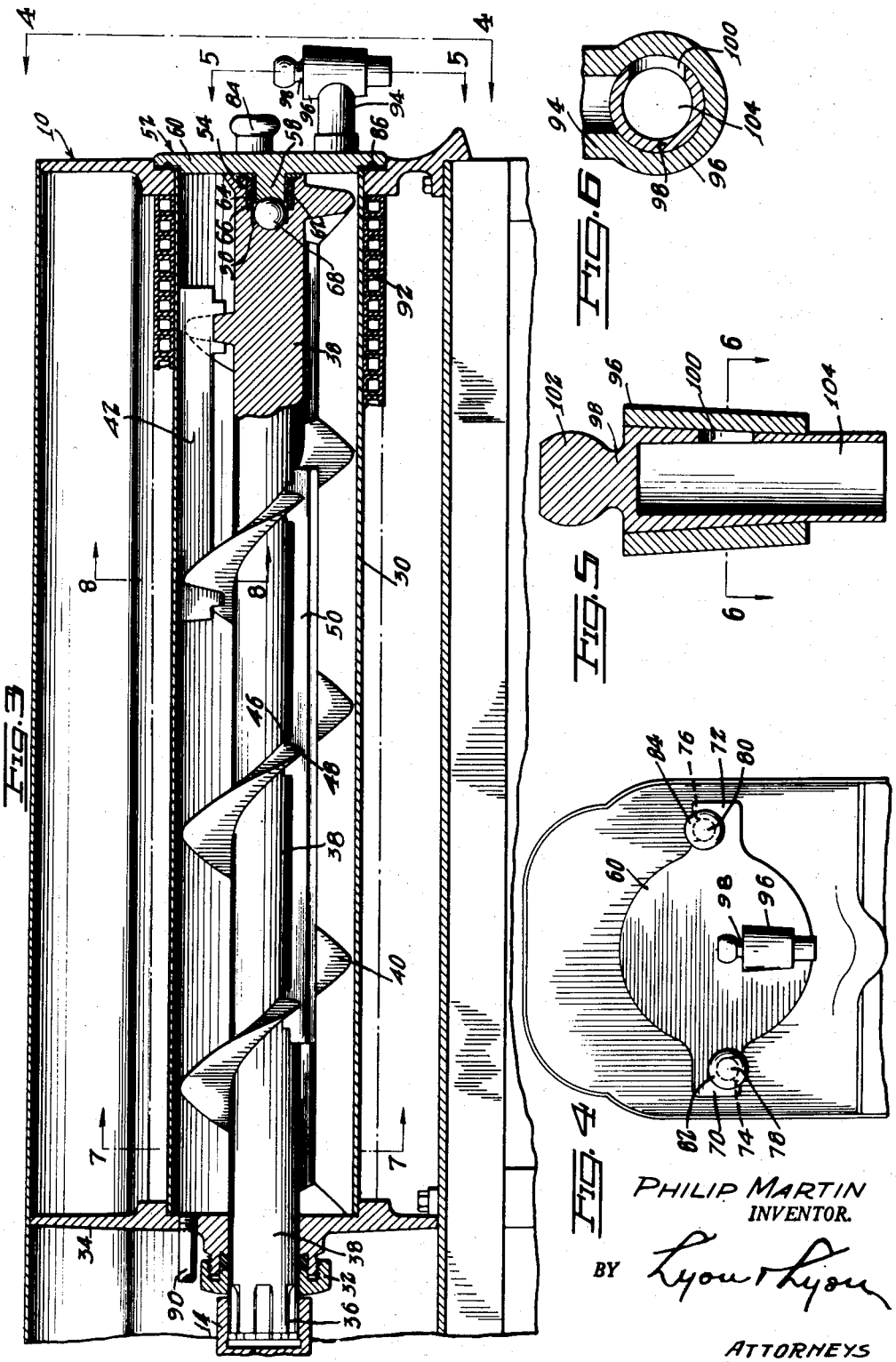
PHILIP MARTIN
INVENTOR.
BY
ATTORNEYS Patented July 21, 1953

2,645,911

UNITED STATES PATENT OFFICE 2,645,911

FROZEN MIX MAKING DEVICE

Philip Martin, North Hollywood, Calif., assignor to Foster's Freeze National Corporation, Los Angeles, Calif., a corporation of California Application April 29, 1950, Serial No. 158,965

10 Claims. (Cl. 62—114)

This invention relates to an improved device for freezing ice cream, iced milk, frozen mix, or the like.

It is an object of this invention to provide a device wherein the parts are easily removable for cleaning and for repair, it being customary that devices of this nature are cleaned daily.

It is a further object of this invention to insure that during the freezing process the mix will not adhere to the walls of the freezing drum and to insure continuous unobstructed flow of the mix through the device.

It is a further object of this invention to provide a support for the rotating shaft which will not permit the escape of lubrication to the freezing drum, thereby contaminating the frozen mix.

It is a further object of this invention to provide a maximum heat transfer during the freezing process.

The device generally comprises a freezing drum or cylinder wherein a rotatable shaft is removably retained, and wherein a helical screw is mounted on the rotatable shaft and scraper blades are mounted on the helical screw to insure a continual movement of the frozen mix through the drum during the freezing cycle. Suitable refrigerant means are provided about the freezing drum to reduce the temperature in said drum below the freezing temperature of the mix.

Other objects and advantages of this device will become apparent from the following description.

In the drawings:

Figure 3 represents a sectional view of the freezing drum and its associated parts;

Figure 4 is an end view taken along the line 4—4 of Figure 3;

Figure 5 is a sectional view taken along the line 5—5 of Figure 3;

Figure 6 is a sectional view taken along the line 6—6 of Figure 5.

Figure 1:
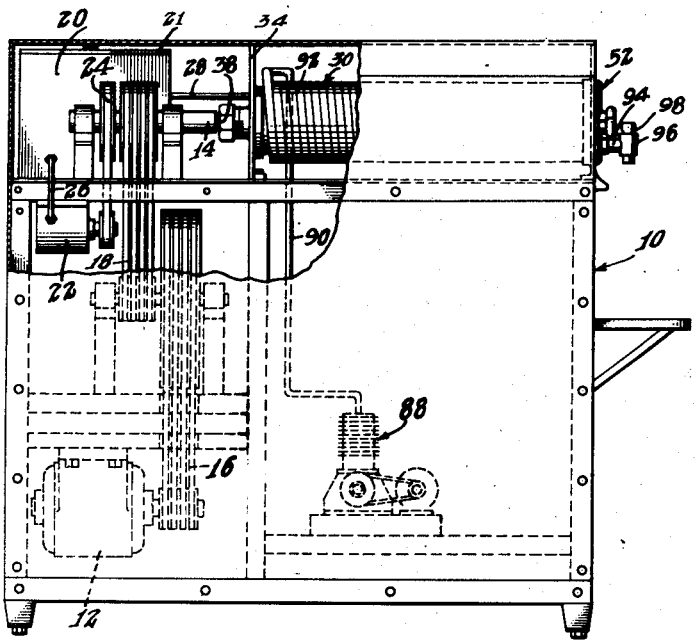
Figure 1 represents a side elevation of a frozen mix making device embodying this invention.
Figure 2:
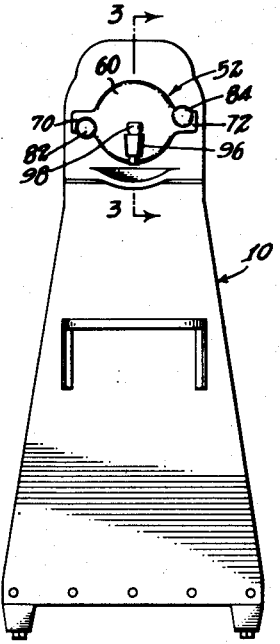
Figure 2 represents an end view of the device.

Referring now to Figure 1 wherein the complete frozen mix making device is illustrated supported in a frame 10. A motor 12 is provided to rotate drive shaft 14 by means of belts 16 and 18. The manner in which shaft 14 is rotated comprises no part of this invention and any suitable means may be provided for accomplishing this result. The rotatable drive shaft 14 is connected to the rotatable shaft 38, causing the latter to rotate, the two shafts being splined at 36 to effect this connection. A packing gland 32 may be provided to prevent leakage between rear plate 34 and the rotatable shaft 38. The material to be frozen is stored in container 20 and a pump 22 driven by belt 24 provides pressure through line 26 forcing the mix through line 28 into the freezing drum 30. A lid 21 is provided on the container 20 to permit refilling of said container.

A helical screw 40 is either cast with the rotatable shaft 38, or suitably attached thereto, so that when the frozen mix enters the freezing drum 30 through line 28, the helical screw 40 being rotated will carry the mix through the length of the freezing drum. Suitable scraping blades 42 and 50 are provided to prevent the frozen mix adhering to the sides of the freezing drum and to insure continual progress of the frozen mix through the freezing drum.

Figure 9:
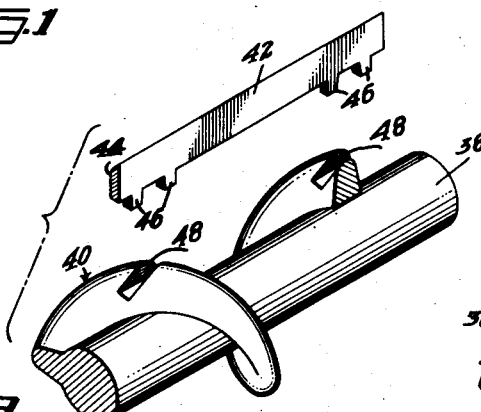
Figure 9 is a perspective view of a portion of the rotatable shaft showing a scraper blade and its mounting on the helical screw.
Figure 8:
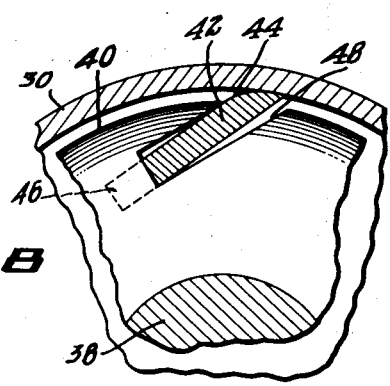
Figure 8 is a sectional view along the line 8—8 of Figure 3.
Figure 7:
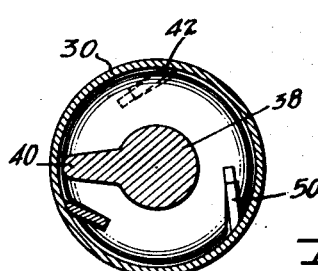
Figure 7 is a sectional view taken along the line 7—7 of Figure 3.

Referring now to Figure 9, wherein a scraping blade is illustrated, the blade may be provided with a bevel 44, which during rotation is in contact with the inner surface of the freezing drum. The scraping blade 42 is provided with projections 46 which are positioned on the blade, so as to retain the blade in the inclined indentations or notches 48 provided in opposed sections of the helical screw. In this particular embodiment, the projections 46 are positioned so that one of said projections falls on either side of the helical blade when the scraper blades are mounted. This positioning of the projections 46 prevents any lateral motion of the blade during rotation and also permits removal of the blades during cleaning or repairing of the device. It is, of course, apparent that the number of projections 46 may be varied, it being a matter of preference to provide two of such projections for each indentation or notch in the helical screw. This manner of mounting the scraping blades on the helical screw permits some motion of the blade during rotation as best seen in Figure 8, to facilitate scraping the frozen mix off the wall of the freezing drum. The scraping blades may extend between two opposed sections of the helical screw as illustrated by the blade 42 in Figures 3 and 9, or may extend between three such opposed sections of the helical screw as illustrated by the blade 50 in Figure 3, the size of the blades used being merely a matter of choice. While it is preferred to utilize three such blades spaced at an equidistance around the circumference of the helical screw, as seen in Figure 8 the number of blades, their positioning and length is a matter of choice.

The front end 52 of rotatable shaft 38 is supported by the bearing, generally designated 54, which comprises a recess in the front end of the rotatable shaft 38, and an extension 58 of the front cover plate 60, which extension may be provided with suitable bearing material 62 to provide a bearing surface. A sleeve 64 is provided, which fits into a suitable recess 66 in the rotatable shaft and surrounds the extension 58 of the front plate, thus preventing any lateral or vertical motion of rotatable shaft 38, and a ball 68 is retained in the recess 56 of the rotatable shaft 38, which is suitably formed to retain said ball between said recess 56 and the extension 58 of the front cover plate 60 which is also suitably shaped to receive said ball. When the rotatable shaft is supported in this manner with the extremity of the rotatable shaft bearing against the front cover plate 60, it is apparent that lubricant in the bearing 54 is sealed off from the inside of the freezing drum thus preventing contamination of the frozen mix.

To support the rotatable shaft 38 during rotation, the front cover plate 60, as best seen in Figure 4, is provided with extensions 70 and 72, said extensions being provided with suitable indentations 74 and 76 to fit about bolts 78 and 80 provided in the frame 10 on either side of the freezing drum, and nuts 82 and 84 are screwed onto said screws to retain the front cover plate 60 in the proper position. Said front cover plate through extension 58 supports the rotatable shaft 38 while still permitting rotation of said rotatable shaft by means of bearing 54. A sealing O ring 86 is provided between the frame 10 and the front plate 60 to prevent leakage from the freezing drum around the front plate 60. It is apparent that the whole device is readily accessible for cleaning and repair. When the nuts 84 and 82 are loosened and removed the front plate 60 is free to be removed. The bearing 54 is of such a nature that it is unnecessary to loosen or otherwise adjust any of its parts to release the front plate. The rotatable shaft can then be withdrawn from freezing drum 30, the spline connection 36 permitting withdrawal, and the scraper blades 42 and 50 are then readily removable as has hereinbefore been described.

The freezing drum 30 is cooled below the freezing temperature of the mix by a suitable refrigeration system. The details of this system will not be described, as any system well-known to those skilled in the art may be used. The cold refrigerant is supplied by a compressor 88 through line 90 to the tubing 92, which is coiled about the drum. It is preferred that this tubing be of a square cross-section as illustrated in Figure 3 rather than the conventional round tubing. By providing a rectangular cross-section, a maximum surface of the tubing will bear upon the freezing drum, providing a maximum heat transfer. It is also preferred to solder each coil of the tubing to the drum as well as to the adjacent coils. In this manner, the heat transfer is further facilitated. The refrigerant after freezing the contents of the drum returns from the tubing 92 to the compressor 88 and is cooled and recirculated.

After the mix is frozen in the drum, it passes through front plate 60 through a suitable opening into the discharge pipe 94. At the extremity of the pipe 94 a tapered sleeve 96 is provided suitably attached to said pipe into which the frozen mix may pass.

Referring now to Figures 5 and 6, the tapered plug member 98 is machined to be retained within tapered sleeve 96 and prevent the flow of frozen mix. The plug member 98 is provided with an aperture 100 of approximately the same size as the opening from pipe 94 into the sleeve 96, so that when the plug member 98 is rotated by handle 102, the aperture 100 will oppose the opening from pipe 94 into sleeve 96 and permit the flow of mix into the hollow central portion 104 of plug member 98. The mix is then discharged from the lower portion of plug member 98. It is apparent that the flow of mix discharged from plug member 98 can be controlled by the positioning of the aperture 100 with respect to the opening from pipe 94 into sleeve 96 as best seen in Figure 6.

The operation of this device is as follows. Mix is forced from container 20 into the freezing drum 30. The helical screw 40 on the rotating shaft 38 will carry the mix through the length of the freezing drum while scraping blades 42 and 50 prevent the mix from adhering to the inner walls of the freezing drum. The drum 30 is cooled below the freezing temperature of the mix by means of refrigerant circulating through the coil 92. The mix then passes through the front plate 60 into the pipe 94 and thence into sleeve 96. Plug member 98 is rotated until the aperture 100 opposes the opening from pipe 94 into sleeve 96, thus permitting discharge of the mix from the lower portion of plug member 98.

While the above description is of the preferred construction of this device, it is apparent that various changes in the size, form, shape and location of the various elements of the device can be resorted to without departing from the scope of this invention or of the appended claims.

I claim:

1. In a device for freezing mix of the class having a freezing drum, a rotatable shaft mounted in said freezing drum, and a helical screw on said rotatable shaft provided with indentations in opposed sections of said screw, the combination with said helical screw of a scraping blade of a substantially smaller thickness than said indentation and adapted to fit within said indentations thereby permitting transverse movement of said blade in said indentation, a plurality of projections on said scraping blade which retain said blade in said indentation.

2. In a device for freezing mix of the class having a freezing drum, a rotatable shaft mounted in said freezing drum, and a helical screw on said rotatable shaft provided with inclined indentations in opposed sections of said screw, the combination with said helical screw of a scraping blade of a substantially smaller thickness than said indentation and adapted to fit within said indentations thereby permitting transverse movement of said blade in said indentation, a plurality of projections on said scraping blade which retain said blade in said indentation, a beveled portion on said blade adapted to bear against the freezing drum when said scraping blade is retained in said inclined indentations.

3. In a device for freezing mix of the class having a freezing drum, a rotatable shaft mounted in said freezing drum, and a helical screw on said rotatable shaft provided with indentations in opposed sections of said screw, the combination with said helical screw of a scraping blade of a substantially smaller thickness than said indentation and adapted to fit within said indentations, a plurality of projections on said scraping blade so spaced that one of said projections on said scraping blade will be on each side of said helical screw when said scraping blade is mounted in said indentations.

4. In a device for freezing mix of the class having a freezing drum, a rotatable shaft mounted in said freezing drum, and a helical screw on said rotatable shaft having inclined indentations in opposed sections of said helical screw, the combination with said helical screw of a scraping blade of a substantially smaller thickness than said indentation and, adapted to be mounted in said inclined indentations thereby permitting transverse movement of said blade in said indentations, a beveled portion on said blade adapted to bear against the freezing drum when said scraping blade is mounted in said indentations.

5. In a device for freezing mix of the class having a freezing drum, a rotatable shaft mounted in said freezing drum, and a helical screw on said rotatable shaft having inclined indentations on the periphery of opposed sections of said helical screw, the combination with said helical screw of a scraping blade of a substantially smaller thickness than said indentation and adapted to be mounted in said indentations thereby permitting transverse movement of said blade in said indentations, a plurality of projections on said scraper blade so spaced that one of said projections will be on each side of said helical screw when said scraping blade is mounted in said indentations, a beveled portion on said blade adapted to bear against the freezing drum when said scraping blade is mounted in said inclined indentations.

6. In a frozen mix making device of the class having a freezing drum and means for circulating refrigerant around said drum, the combination with said means for circulating refrigerant of a tubing adapted to be wound around said freezing drum to carry said refrigerant and having a rectangular cross-sectional area.

7. In a device for freezing mix of the class having a freezing drum and a front cover plate to close off said drum, the combination of: a ball, an extension on said front cover plate, a sleeve adapted to fit on said extension, a rotatable shaft provided with a suitable recess in the end of said shaft to receive said sleeve in said recess, also suitable to retain said ball between said rotatable shaft and said extension.

8. In a device for freezing mix of the class having a freezing drum and a front cover plate to close off said drum, the combination of: a ball, an extension on said front cover plate, a sleeve adapted to fit on said extension, a rotatable shaft provided with a suitable recess in one extremity of said shaft to telescopically receive said sleeve in said recess to suitably retain said ball between said rotatable shaft and said extension so that said extremity of said rotatable shaft will bear against said front cover plate.

9. In a device for freezing mix of the class having a freezing drum and a front cover plate to close off said drum, the combination of: a ball, an extension on said front cover plate which is grooved to receive said ball, a sleeve adapted to fit on said extension, a rotatable shaft provided with a recess in one extremity of said shaft adapted to telescopically receive said sleeve in said recess and grooved at said recess's innermost extremity to retain said ball against said groove in said extension.

10. In a device for freezing mix of the class having a freezing drum and a front cover plate to close off said drum, the combination of: a ball, an extension on said front cover plate which is grooved to receive said ball, a sleeve adapted to fit on said extension, a rotatable shaft provided with a recess in one extremity of said shaft adapted to telescopically receive said sleeve in said recess and grooved at said recess's innermost extremity to retain said ball against said groove in said extension so that said extremity of said rotatable shaft will bear against said front cover plate.

PHILIP MARTIN.

References Cited in the file of this patent

UNITED STATES PATENTS

| Number | Name | Date |
| --- | --- | --- |
| 2,191,344 | Erickson | Feb. 20, 1940 |
| 2,506,101 | Oltz | May 2, 1950 |
| 2,511,314 | Yohe | June 13, 1950 |
| 2,535,462 | Stoeling | Dec. 26, 1950 |